Inventor
ROBERT E. ARICK
by JEFFERS & YOUNG
Attorneys

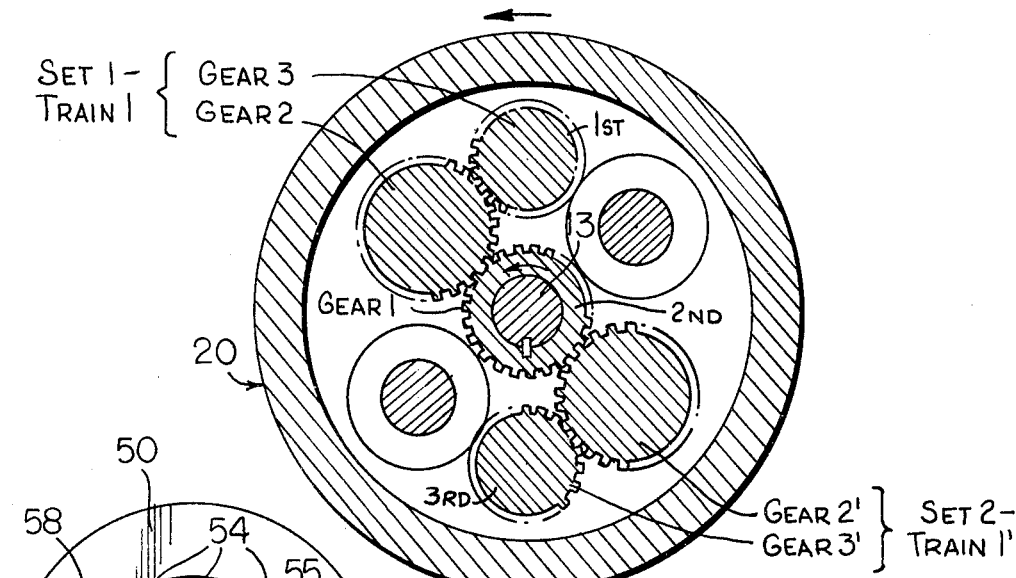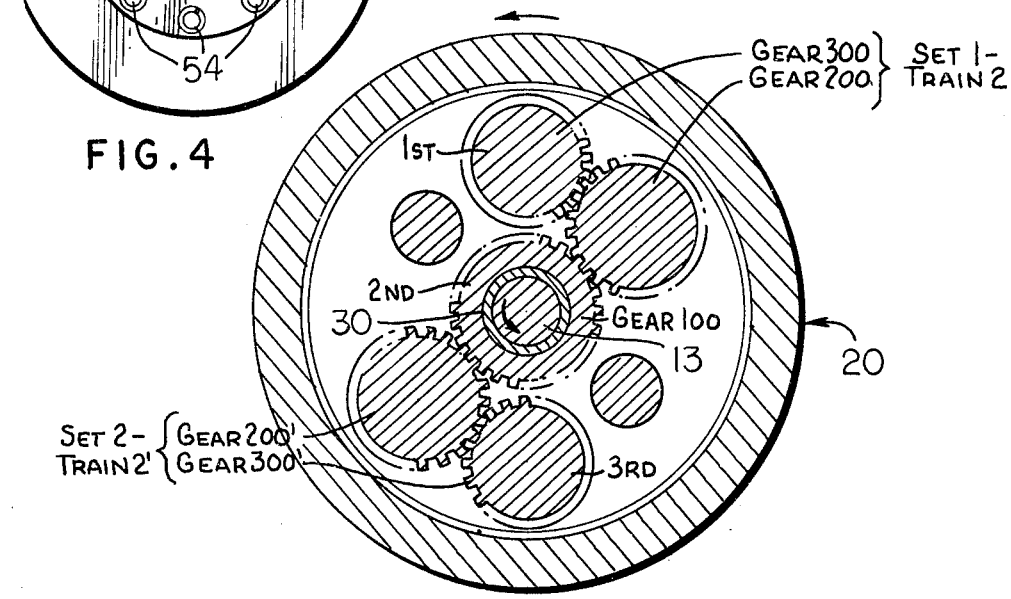

United States Patent Office 3,501,980
Patented Mar. 24, 1970

3,501,980
GEAR ARRANGEMENT
Robert E. Arick, Fort Wayne, Ind., assignor to The Minster Machine Company, Minster, Ohio, a corporation of Ohio
Filed Apr. 8, 1968, Ser. No. 719,552
Int. Cl. F16h 1/28, 3/44
U.S. Cl. 74—781
9 Claims

ABSTRACT OF THE DISCLOSURE

A rotatable housing is coupled to an output shaft through two gear trains having respective ratios greater than and less than unity. The ratio between the housing and output shaft is the difference between the two ratios of the gear trains, and may be made relatively high. The housing may also be connected through the gear trains to the output shaft for a unity ratio.

BACKGROUND OF THE INVENTION

My invention relates to an improved gear arrangement, and particularly to an improved gear arrangement for providing a selectable high ratio or a unity ratio between a rotatable housing and an output shaft.

In machine tools such as presses, it is frequently desirable to be able to move the press crankshaft and crankarm at a relatively slow speed, and to be able to stop the crankarm at various points in the cycle of a stroke in order to see and consider the operation of the press. For example, initially when a press die is set up and a tool is attached to the crankarm, it is helpful and desirable to see the movement of the tool against the workpiece and die as the crankarm moves. Normally, a cycle of a press stroke takes only a few seconds or less, so that the human eye cannot follow or see the movement, interrelation, and action of the various parts during a stroke. In order to look at the tool, die, and workpiece at various points during a stroke, attempts have been made to move the crankshaft and crankarm a small distance and stop, and then consider the tool, die, and workpiece. The crankshaft and crankarm are advanced a little farther and stopped again for consideration. The process is continued until the stroke is completed. However, this starting and stopping causes considerable wear and heating of the press clutch, with the result that if a stroke is considered at many different points, the clutch may be worn considerably. Consequently, press operators have been faced with the alternatives of either considering a press stroke on the basis of the workpiece after the stroke; or considering a press stroke point by point by engagement and disengagement of the press clutch. Neither alternative has been completely satisfactory. The first alternative may ruin a tool or die on the first stroke, and after the expenditure of much time and money. The second alternative may ruin a press clutch or wear it excessively.

Accordingly, an object of my invention is to provide an improved gear arrangement for presses which causes a tool operation or press stroke to extend over a relatively long period of time.

Another object of my invention is to provide an improved gear arrangement for presses and the like that permits a relatively high ratio between the input power to the press and the press flywheel to be easily and quickly substituted for the working or normal ratio.

Another object of my invention is to provide an improved press gear drive arrangement that has a selectable ratio between the input power and press flywheel that may be either unity for normal operation, or a high ratio for causing the flywheel to move relatively slowly.

Previously, some attempts have been made to provide means for causing the press flywheel to move relatively slowly so that a stroke operation can be seen and studied over a relatively long period of time. This has been achieved by the use of a second relatively slow speed motor to drive the flywheel during the time that the press operation is to be seen and studied. However, the use of this second motor has required additional mechanisms and equipment, all of which are expensive and time consuming to place in operation.

Accordingly, another object of my invention is to provide an improved gear arrangement that provides a selectable speed to a press flywheel, and that can be operated relatively quickly by the simple use of compressed air to shift the speed.

Another object of my invention is to provide an improved drive arrangement for presses that does not require appreciable extra equipment such as a motor and related connections.

SUMMARY OF THE INVENTION

Briefly, these and other objects are achieved in accordance with my invention by an output shaft which is mounted for rotation about a main longitudinal axis. A housing is provided for rotation about this main longitudinal axis. A first gear train is provided and comprises a first gear fixedly mounted on the output shaft, an idler gear mounted for rotation on the housing and in engagement with the first gear, and a third gear mounted for rotation on the housing and in engagement with the idler gear. A second gear train is provided and comprises a first gear mounted for rotation on the output shaft, an idler gear mounted for rotation on the housing and in engagement with the first gear of the second gear train, and a third gear mounted for rotation on the housing in engagement with the idler gear of the second gear train and in a fixed angular relation with the third gear of the first gear train. One of the gear trains has an overall ratio that is greater than unity, and the other of the gear trains has an overall ratio that is less than unity. The first gear of the second gear train may be locked or fixed against rotation. Under this condition, when the housing is rotated, a high ratio is provided between the housing and the output shaft. When this first gear of the second gear train is permitted to rotate on the output with the housing, a one to one ratio is provided between the housing and the output shaft. Thus, I provide a gear arrangement which can be easily shifted between a high and low ratio without the necessity of additional equipment or clutches.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

FIGURE 2 shows a transverse cross sectional view of my gear arrangement taken along the line 2—2 in FIGURE 1;

FIGURE 3 shows a transverse cross sectional view of my gear arrangement taken along the line 3—3 of FIGURE 1;

FIGURE 4 shows a transverse cross sectional view of my gear arrangement taken along the line 4—4 of FIGURE 1;

DESCRIPTION OF THE PREFERRED EMBODIMENT

Figure 1:
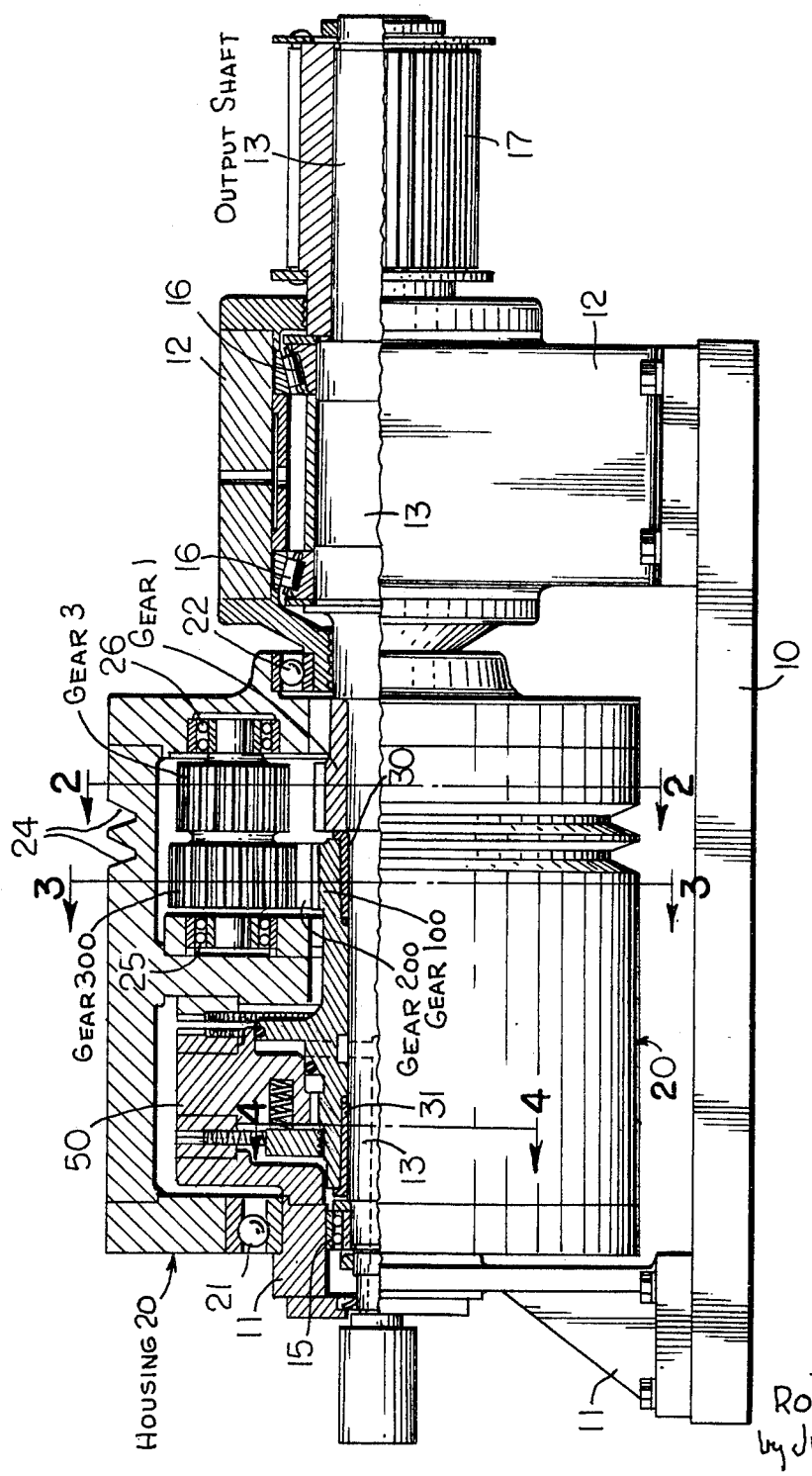
FIGURE 1 shows a longitudinal view, partly in cross section, of an improved gear arrangement in accordance with my invention.

With reference to FIGURES 1 through 4, I have shown my gear arrangement mounted in a suitable structure for use with a press. However, it is to be understood that my gear arrangement can be used with any type of machine or tool where it is desired to selectively provide either a relatively high ratio for observing motion or a relatively low or unity ratio for normal operation. With respect to FIGURE 1, my arrangement is mounted on a suitable base 10, on which uprights 11, 12 are mounted and extend upward. An output shaft 13 is mounted for rotation on the uprights 11, 12 by suitable bearings 15, 16. An output sheave 17 is attached to the output shaft 13. A flywheel (not shown) would be driven by the sheave 17, and a crankshaft or other motion translating device (also not shown) would be driven by the flywheel. This crankshaft or other device is not shown in FIGURE 1, as it may take a number of forms and arrangements not pertinent to my invention. A housing 20 is rotatably mounted on the uprights 11, 12 by suitable bearings 21, 22. The housing 20 is driven in rotation about the output shaft 13 by any suitable means, as by V-belts (not shown) which fit in the grooves 24. Other types of drives, for example gears, may be used to drive or rotate the housing 20.

Within the housing 20 are positioned or located two sets of similar and symmetrically positioned spur gears designated set 1 and set 2. Each set of gears has two gear trains designated train 1 and train 2, and train 1' and train 2' respectively. As will be better understood as my invention is further explained hereinafter, I provide two sets of gears to provide a symmetrical construction and additional gears for a correspondingly greater power handling capability. However, it should be understood that my invention may have only one set of gears with two gear trains, or three or more sets of gears, each with two gear trains, depending upon the particular structure and arrangement desired. FIGURE 2 shows the two gear trains 1 and 1' (of the two sets of gears) which are positioned along the section line 2—2 in FIGURE 1. Each of these two gear trains 1 and 1' utilizes a common gear 1 which is rigidly attached to the output shaft 13 by any suitalbe means, such as a key. In train 1 of set 1, the common gear 1 is in engagement with or in mesh with an idler gear 2 which is rotatably mounted on the housing 20 by bearings (not shown). The idler gear 2 is in engagement with or in mesh with a gear 3 which is mounted in suitable bearings 25, 26 for rotation in the housing 20. In train 1' of set 2, the common gear 1 is in engagement with or in mesh with an idler gear 2' which is symmetrically positioned on the same diameter as the idler gear 2, and which is rotatably mounted on the housing 20 by bearings (not shown). The idler gear 2' is in engagement with or in mesh with a gear 3' which is symmetrically positioned on the same diameter as the gear 3 and which is rotatably mounted on the housing 20 by bearings (not shown). The respective axes of the gears 2, 3, 3', 3' are parallel to and spaced from the axis of the output shaft 13 and the housing 20. The idler gears 2, 2' are preferably identical, and the gears 3, 3' must be identical. In FIGURE 1, only the gear 1 and the gear 3 in the train 1 are visible or shown. The gear 2 of the train 1 would be positioned between the viewer and gear 1 and gear 3. The idler gear 2' and the gear 3' in the train 1' are positioned in the full drawn part of the housing 20, and hence are not visible.

FIGURE 3 shows the two gear trains 2 and 2' (of the two sets of gears) which are positioned along the section line 3—3 in FIGURE 1. Each of these two gear trains 2 and 2' utilizes a common gear 100 which is rotatably mounted on the output shaft 13 by suitable bearings 30, 31. In train 2 of set 1, the common gear 100 is in engagement with or in mesh with an idler gear 200 which is rotatably mounted on the housing 20 by bearings (not shown). The idler gear 200 is in engagement or in mesh with a gear 300 which is fixedly mounted on the same shaft as the gear 3 and in the bearings 25, 26 for rotation in the housing 20. In train 2' of set 2, the common gear 100 is in engagement with or in mesh with an idler gear 200' which is symmetrically positioned on the same diameter as the idler gear 200, and which is rotatably mounted on the housing 20 by bearings (not shown). The idler gear 200' is in engagement with or in mesh with a gear 300' which is symmetrically positioned on the same diameter as the gear 300 and which is fixedly mounted on the same shaft as the gear 3' for rotation in the housing 20 by bearings (not shown). The respective axes of the gears 200, 300, 200', 300' are parallel to and spaced from the axes of the output shaft 13 and the housing 20. The idler gears 200, 200' are preferably identical, and the gears 300, 300' must be identical. In FIGURE 1, the gear 100, the idler gear 200, and the gear 300 in the train 2 are visible and shown. The idler gear 200' and the gear 300' in the train 2' are positioned in the full drawn part of the housing 20, and hence are not visible.

Since the gear trains 1 and 1' of the sets 1 and 2 are substantially similar, they have corresponding ratios. Thus, the ratio from gear 1 through gear 2 to gear 3 in the train 1 is the same as the ratio from gear 1 through gear 2' to gear 3' in the train 1'. And since the gear trains 2 and 2' of the sets 1 and 2 are substantially similar, they have corresponding ratios. Thus, the ratio from gear 100 through gear 200 to gear 300 in the train 2 is the same as the ratio from gear 100 through gear 200' to gear 300' in the train 2'. In order to explain my invention, I have selected a typical example of gear sizes. These sizes are as follows:

| Gear designation | Number of teeth | Pitch diameter, inches |
| --- | --- | --- |
| Gear 1 | 18 | 2.5714 |
| Gears 2 and 2' | 22 | 3.1429 |
| Gears 3 and 3' | 16 | 2.2857 |
| Gear 100 | 20 | 2.8571 |
| Gears 200 and 200' | 22 | 3.1429 |
| Gears 300 and 300' | 18 | 2.5714 |

If the gear 100 is held so that it cannot rotate, as by a mechanism which will be explained, then when the housing 20 rotates (in a given direction such as counter-clockwise in FIGURES 2 and 3), the gear 1 and the output shaft 13 rotate (in the same direction) 1/81 of a revolution for each revolution of the housing 20. This is explained as follows: The ratio from gear 3 through gear 2 to gear 1 (train 1) is 16/22×22/18 or 8/9, which is less than unity. The ratio from gear 100 through gear 200 to gear 300 (train 2) is 20/22×22/18 or 10/9, which is greater than unity. (Similar ratios are respectively provided by the gears 3', 2', and 1, and the gears 100, 200', and 300'.) The amount of rotation of the output shaft 13 is 1−(8/9×10/9), which equals 1−80/81, or 1/81. Thus, 81 revolutions of the housing 20 are required in order to produce one revolution of the output shaft 13. This relatively high ratio is easily provided by the trains 1 and 1' and the trains 2 and 2' being only slightly less than and slightly greater than unity, respectively. In other words, for ratios of the gear trains which differ below and above unity by only a very small amount, a relatively high ratio can be provided. For example, if the ratio of the train 1 (and also train 1') is 19/20 and the ratio of the train 2 (and also train 2') is 21/20, then the ratio between the housing 20 and the output shaft 13 would be:

$$1-(19/20 \times 21/20)$$

which equals 1−399/400, or 1/400. In this example, 400 revolutions of the housing 20 would be required to produce one revolution of the output shaft 13. It will thus be seen that my sets of gear trains provides a relatively large ratio, so that for a typical high speed rotation of the housing 20, the output shaft 13 rotates relatively slowly. This permits the output shaft 13 and its accompanying crankpin and crankarm to move relatively slowly so that the relation of the moving and stationary parts can be easily seen, even though the housing 20 is rotating at its normal work speed. In these calculations, a positive answer indicates that the output shaft 13 and the gear 1 rotate in the same direction as the housing 20. If the answer for a selected set of gears is negative, this indicates that the output shaft 13 and the gear 1 rotate in the opposite direction from the housing 20.

Figure 5:
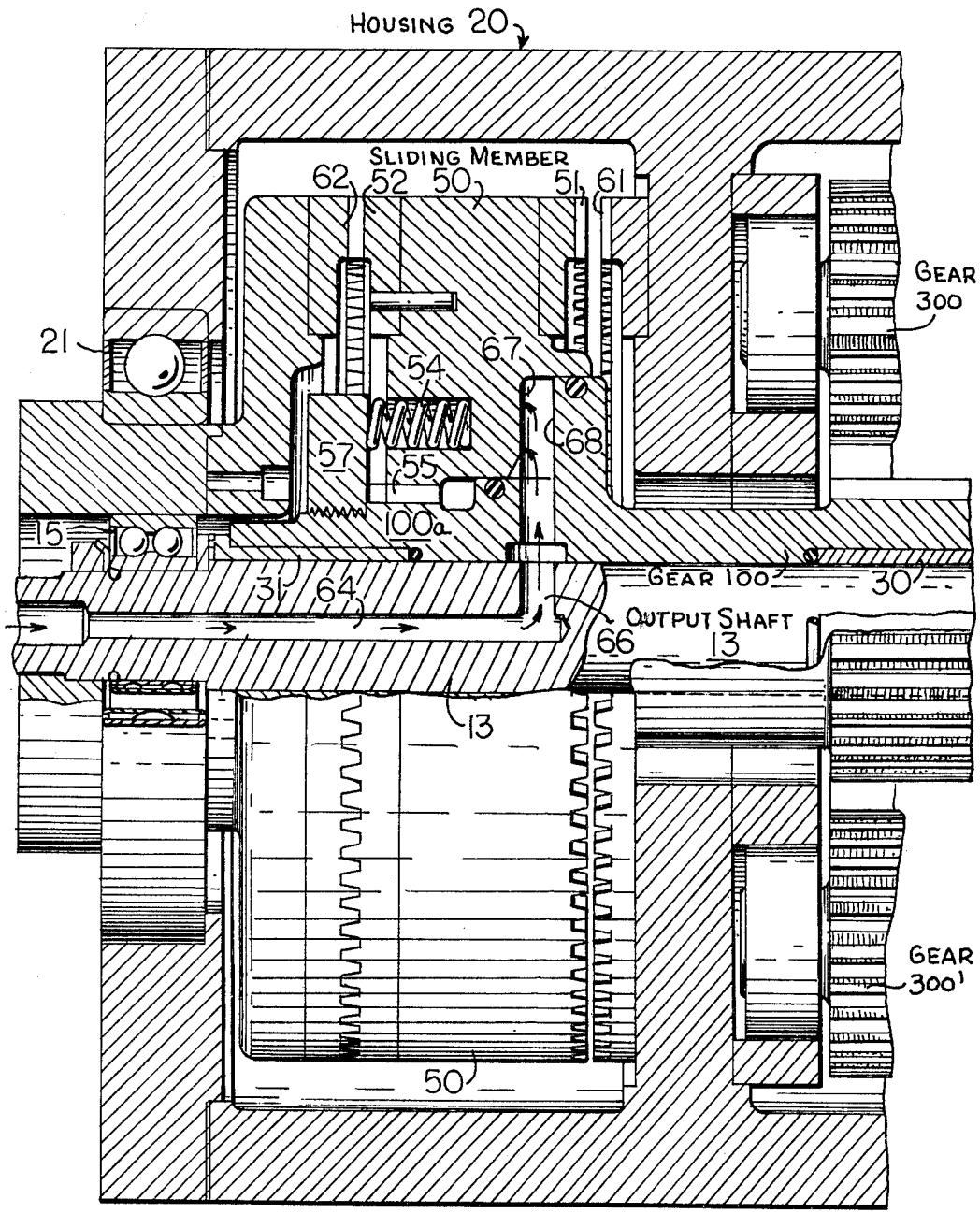
FIGURE 5 shows a longitudinal cross sectional view of the ratio changing feature of my invention with the arrangement in the high ratio condition.
Figure 6:
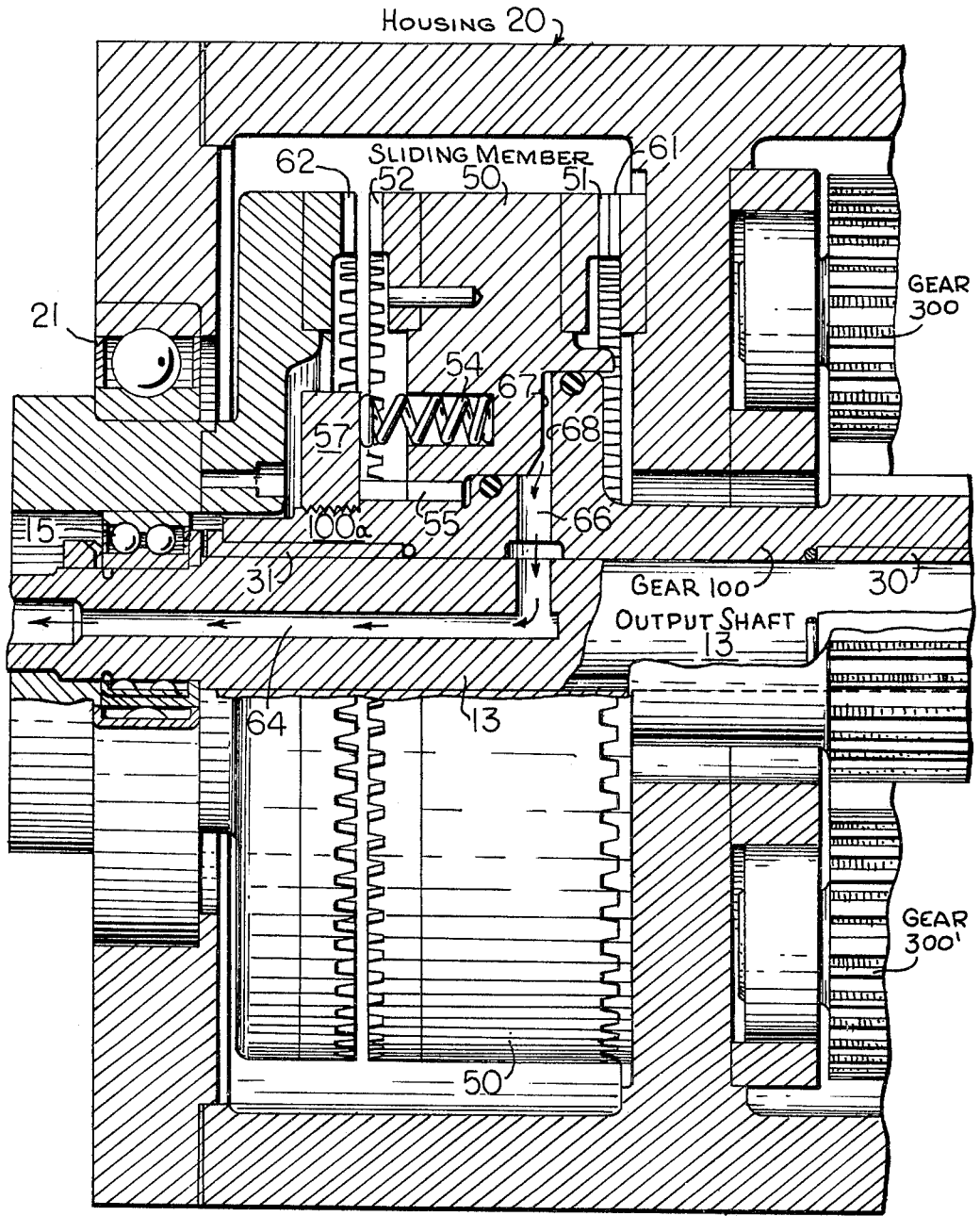
FIGURE 6 shows a longitudinal cross sectional view of the ratio changing feature of my invention with the arrangement in the low ratio condtion.

FIGURE 1 shows my gear arrangement with its ratio changing mechanism positioned for the high ratio between the housing 20 and the output shaft 13. FIGURES 5 and 6 show more detailed views of the ratio changing mechanism positioned for high and a low ratios respectively. The ratio changing mechanism comprises a circular sliding member 50 having gear teeth 51, 52 on opposite faces thereof. The sliding member 50 is attached to the gear 100 at a portion 100a by one or more circularly positioned sliding keys or splines 55, so that it can slide concentrically along the ouptut shaft 13 but so that it is angularly fixed relative to and rotates with the gear 100 in either its left-hand or right-hand position. The teeth 51 of the sliding member 50 are positioned in facing relation to gear teeth 61 which are integral with or mounted on the housing 20. Likewise, the teeth 52 of the sliding member 50 are positioned in facing relation to gear teeth 62 which are fixed in location so that they cannot move or rotate. The sliding member 50 is normally urged to the right, as shown in FIGURE 6, by urging means such as one or more compression springs 54. In this position, the teeth 51, 61 are engaged or meshed. The tension of the springs 54 can be adjusted by movement of a plate 57 which is threaded on the portion 100a of the gear 100, and locked by a bolt 58. The sliding member 50 can be moved to the left against the springs 54 so that the teeth 52 engage or mesh with the fixed teeth 62 by compressed air which is applied through a longitudinal opening 64 positioned in the output shaft 13. This compressed air can be supplied by any suitable means, and moves along the opening 64 and upward and outward through a plurality of symmetrically positioned radial holes 66 against a face 67 of the sliding member 50. The opposing face 68 on the gear 100 is fixed longitudinally, so that the compressed air overcomes the force of the springs 54 and moves the sliding member 50 to the left and causes its teeth 52 to engage with the fixed teeth 62. Thus, the sliding member 50 and the gear 100 cannot rotate, but are held or locked. This condition provides the high ratio of rotation of the housing 20 with respect to the output shaft 13.

When a working or normal ratio, for example one to one, is desired, the air in the opening 64 is vented. The compression springs 54 cause the sliding member 50 to move to the right so that its teeth 52 become disengaged from the teeth 62, and so that its teeth 51 become engaged with the teeth 61 on the housing 20. Under these conditions, when the housing 20 is rotated, the gear 100 is unlocked and is free to rotate with the housing 20 at the same angular velocity. This rotation is coupled through the idler gears 200, 200' and the gears 300, 300' to cause the gears 3, 3' and 2, 2' and the gear 1 to rotate at the same angular velocity. Rotation of the gear 1 causes the output shaft 13 to also rotate at the same angular velocity as the housing 20. Thus, by a simple arrangement comprising the sliding member 50 and its operating mechanism, such as springs and compressed air, I can change a gear ratio from a working ratio, such as one to one, to a high ratio so that the output shaft rotates at a relatively slow angular velocity with respect to the angular velocity of the housing 20. This arrangement permits the work operation to be seen at a relatively slow speed, with all its desirable advantages. After the slow speed operation has been seen, the arrangement can be changed, by venting the air, to set up the one to one ratio between the housing and output shaft 13. Then work can be conducted at the normal operation.

It will thus be seen that my invention permits changing between a high ratio and a low ratio to be achieved without the use of a clutch or comparable device which is applied and released to inch or move an output shaft a small distance and then stop the output shaft. My arrangement permits the output shaft to be rotated at a relatively slow speed where a work operation or function can be seen. Then, the ratio is easily and quickly changed to a working ratio where the desired operation or work is performed.

While I have shown only one embodiment of my invention, it is to be understood that modifications may be made. For example, instead of two gear trains in each of two sets of gears, two gear trains in only one set of gears or two gear trains in three or more sets of gears may be used. Any desired ratios may be provided for the gear trains. Either gear train of a given set of gears may have a ratio greater than unity, and the other gear train of that given set of gears should have a ratio less than unity. If more than one set of gears is used, it is preferable that the sets of gears have similar, corresponding gear trains to provide a symmetrical arrangement with as few different gears as possible. And, while I have described my invention namely in terms of a press or comparable machine tool, it is to be understood that my invention may be applied in other applications where it is necessary or desirable to switch from a high ratio of operation to a low ratio of operation.

What I claim as new and desire to secure by Letters Patent of the United States is:

1. An improved gear arrangement comprising:
   (a) a housing mounted for rotation about a main longitudinal axis;
   (b) a first shaft mounted on said housing for rotation about a first longitudinal axis that is parallel to and spaced from said main longitudinal axis;
   (c) a second shaft mounted for rotation about a second longitudinal axis that is coincident with said main longitudinal axis;
   (d) a first gear train comprising a first gear fixedly mounted on said first shaft, a second gear fixedly mounted on said second shaft, and an idler gear rotatably mounted on said housing and in engagement with said first and second gears of said first gear train, said first gear train having a first overall ratio between said first and second gears;
   (e) a second gear train comprising a first gear fixedly mounted on said first shaft, a second gear rotatably mounted on said second shaft, and an idler gear rotatably mounted on said housing and in engagement with said first and second gears of said second gear train, said second gear train having a second overall ratio between said second and first gears;
   (f) one of said overall ratios being greater than unity and the other of said overall ratios being less than unity;
   (g) and ratio changing means for selectively connecting said housing to said second gear of said second gear train to cause said second shaft to rotate at the same angular speed as said housing, and for selectively locking said second gear of said second gear train against rotation to cause said second shaft to rotate at a lower angular speed than said housing.

2. The improved gear arrangement of claim 1, and further comprising means for selectively locking said second gear of said second gear train against rotation and for selectively connecting said second gear of said second gear train to said housing for rotation therewith, and thereby provide a selectable ratio between said housing and said second shaft.

3. The improved arrangement of claim 1, and further comprising:
   (a) a third shaft mounted on said housing for rotation about a third longitudinal axis that is parallel to and spaced from said main longitudinal axis;
   (b) a third gear train comprising a first gear substantially similar to said first gear of said first gear train fixedly mounted on said third shaft and an idler gear rotatably mounted on said housing and in engagement with said first gear of said third gear train and with said second gear of said first gear train, said third gear train having an overall ratio between said first gear of said third gear train and said second gear of said first gear train that is equal to said first overall ratio;
   (c) and a fourth gear train comprising a first gear substantially similar to said first gear of said second gear train fixedly mounted on said third shaft and an idler gear rotatably mounted on said housing and in engagement with said first gear of said fourth gear train and with said second gear of said second gear train, said fourth gear train having an overall ratio between said second gear of said second gear train and said first gear of said fourth gear train that is equal to said second overall ratio.

4. The improved arrangement of claim 3 wherein said first, second, third, and fourth gear trains are symmetrically positioned around said second shaft.

5. An improved gear arrangement for a press and the like, comprising:
   (a) an output shaft mounted for rotation about a main longitudinal axis;
   (b) a housing mounted for rotation about said main longitudinal axis;
   (c) a first gear train comprising a first gear fixedly mounted on said output shaft, an idler gear mounted for rotation on said housing and in engagement with said first gear, and a third gear mounted for rotation on said housing and in engagement with said idler gear;
   (d) a second gear train comprising a first gear mounted for rotation on said output shaft, an idler gear mounted for rotation on said housing and in engagement with said first gear of said second gear train, and a third gear mounted for rotation on said housing in engagement with said idler gear of said second gear train, and in fixed angular relation with said third gear of said first gear train;
   (e) one of said gear trains having an overall ratio that is greater than unity and the other of said gear trains having an overall ratio that is less than unity;
   (f) and means for selectively locking said first gear of said second gear train against rotation to provide a high ratio between said housing and said output shaft, and connecting said first gear of said second gear train to said housing to provide a unity ratio between said housing and said output shaft.

6. The improved gear arrangement of claim 5 wherein said first gear train has a predetermined overall ratio between said third gear and said first gear, said second gear train has a predetermined overall ratio between said first gear and said third gear, and one of said ratios is greater than unity and the other of said ratios is less than unity.

7. The improved gear arrangement of claim 5 wherein said locking nad connecting means comprises a sliding member that slides along said output shaft in fixed angular engagement with said first gear of said second gear train to engage a fixed member and lock said first gear of said second gear train against rotation, and to engage said housing and connect said first gear of said second gear train to said housing.

8. An improved gear arrangement for providing a selectable ratio between a rotating input and a rotating output, comprising:
   (a) an input member mounted for rotation about a first axis;
   (b) an output shaft mounted for rotation about said first axis;
   (c) a second shaft mounted for rotation on said input member about a second axis that is spaced from said first axis;
   (d) a first spur gear mounted on said output shaft for fixed rotation therewith;
   (e) a second spur gear mounted on said output shaft for rotation relative thereto;
   (f) third and fourth spur gears mounted on said second shaft for fixed rotation therewith;
   (g) a fifth spur gear mounted for rotation on said input member as an idler gear between said first and third gears;
   (h) a sixth spur gear mounted for rotation on said input member as an idler gear between said second and fourth gears;
   (i) said first, third, and fifth gears having an overall ratio differing from unity in one direction;
   (j) said second, fourth, and sixth gears having an overall ratio differing from unity in an opposite direction;
   (k) and means for selectively preventing said second gear from rotating to provide a high angular ratio between said input member and said output shaft, and for selectively connecting said second gear to rotate with said input member to provide a unity angular ratio between said input member and said output shaft.

9. The improved gear arrangement of claim 8 wherein said selective means comprise a face gear that rotates with said second gear and that is slidable therealong between a fixed face gear and a face gear on said input member.

References Cited

UNITED STATES PATENTS

| | | | |
|---|---|---|---|
| 2,242,519 | 5/1941 | Frank | 74—781 X |
| 2,399,657 | 5/1946 | Banker | 74—781 X |
| 2,533,056 | 12/1950 | Selby | 74—781 X |
| 2,810,303 | 10/1957 | McGay | 74—781 |
| 2,922,314 | 1/1960 | Johnson et al. | 74—781 X |
| 3,448,828 | 6/1969 | Goldberg | 74—781 X |

FOREIGN PATENTS

| | | |
|---|---|---|
| 451,716 | 4/1913 | France. |
| 1,131,927 | 3/1957 | France. |

LEONARD H. GERIN, Primary Examiner

U.S. Cl. X.R.
74—802